(12) United States Patent
Povey et al.

(10) Patent No.: US 10,788,145 B2
(45) Date of Patent: Sep. 29, 2020

(54) FLUID FLOW CONTROL DEVICE

(71) Applicant: OXFORD FLOW LIMITED, Oxford (GB)

(72) Inventors: Thomas Povey, Oxford (GB); Matthew Collins, Oxford (GB)

(73) Assignee: OXFORD FLOW LIMITED, Oxford (GB)

( * ) Notice: Subject to any disclaimer, the term of this patent is extended or adjusted under 35 U.S.C. 154(b) by 139 days.

(21) Appl. No.: 16/096,558

(22) PCT Filed: Apr. 25, 2017

(86) PCT No.: PCT/GB2017/051149
§ 371 (c)(1),
(2) Date: Oct. 25, 2018

(87) PCT Pub. No.: WO2017/187157
PCT Pub. Date: Nov. 2, 2017

(65) Prior Publication Data
US 2019/0154169 A1 May 23, 2019

(30) Foreign Application Priority Data
Apr. 26, 2016 (GB) .................................. 1607222.5

(51) Int. Cl.
*F16K 47/14* (2006.01)
*F16K 3/26* (2006.01)
(Continued)

(52) U.S. Cl.
CPC .............. *F16K 47/14* (2013.01); *F16K 1/123* (2013.01); *F16K 3/265* (2013.01); *F16K 47/08* (2013.01);
(Continued)

(58) Field of Classification Search
CPC .......... F16K 47/14; F16K 47/08; F16K 3/265; F16K 1/123; Y10T 137/86734;
(Continued)

(56) References Cited

U.S. PATENT DOCUMENTS 2,836,198 A * 5/1958 McNeill .................. F16K 39/04
137/625.39
3,112,764 A * 12/1963 Anderson ................. F16K 3/26
137/504
(Continued)

FOREIGN PATENT DOCUMENTS

CN 203823181 U 9/2014
CN 203847726 U 9/2014
(Continued)

OTHER PUBLICATIONS

Author Unknown, "Axial control valve: streamlined flow path design for demanding applications," Product Brochure, published as early as Dec. 2015, Mokveld Valves BV, 16 pages.
(Continued)

*Primary Examiner* — John Bastianelli
(74) *Attorney, Agent, or Firm* — Withrow & Terranova, P.L.L.C.; Vincent K. Gustafson

(57) ABSTRACT

A device (1) for controlling the flow of fluid through a conduit from an upstream side (3) to a downstream side (5). The device includes a housing (4) with a wall (6) having valve apertures (8) through which the flow of fluid is selectively controlled. A valve member (10) is mounted on one side of the wall of the housing and is arranged to move reciprocally to selectively open and close the valve apertures. A removable insert (12) is mounted on the opposite side of the wall of the housing from the valve member. The removable insert is arranged to cover some of the valve apertures.

16 Claims, 4 Drawing Sheets

(51) Int. Cl.
*F16K 47/08* (2006.01)
*F16K 1/12* (2006.01)
*F16L 55/027* (2006.01)

(52) U.S. Cl.
CPC ....... *F16L 55/027* (2013.01); *F16L 55/02772* (2013.01); *Y10T 137/86734* (2015.04); *Y10T 137/86791* (2015.04); *Y10T 137/86807* (2015.04)

(58) Field of Classification Search
CPC ..... Y10T 137/86807; Y10T 137/86791; F16L 55/027; F16L 55/02772
USPC ......... 251/205–210, 118; 137/625.3, 625.39, 137/625.37; 138/42–43, 45–46
See application file for complete search history.

(56) References Cited

U.S. PATENT DOCUMENTS

| | | | | |
|---|---|---|---|---|
| 3,722,854 A * | 3/1973 | Parola | ..................... | F16K 47/08 251/127 |
| 3,743,238 A * | 7/1973 | Watts | ..................... | F16K 3/029 251/118 |
| 3,794,063 A * | 2/1974 | Carroll | ..................... | F16K 3/26 137/505.26 |
| 4,041,982 A * | 8/1977 | Lindner | ................... | F16K 47/08 137/625.3 |
| 4,109,683 A * | 8/1978 | Strache | ..................... | F16K 3/34 137/625.3 |
| 4,295,493 A * | 10/1981 | Bey | ....................... | F16K 5/0605 138/43 |
| 4,567,915 A * | 2/1986 | Bates | ...................... | F16K 47/08 137/625.3 |
| 5,074,333 A * | 12/1991 | Martin | .............. | F16L 55/02763 137/625.3 |
| 5,230,367 A * | 7/1993 | Minch | ..................... | F16K 47/04 137/375 |
| 8,523,141 B2 * | 9/2013 | Elliott | ..................... | F16K 47/08 251/127 |
| 2004/0011412 A1 | 1/2004 | Wears et al. | | |
| 2012/0174993 A1 | 7/2012 | McHugh | | |

FOREIGN PATENT DOCUMENTS

| | | |
|---|---|---|
| JP | H06249347 A | 9/1994 |
| WO | 2013068747 A1 | 5/2013 |

OTHER PUBLICATIONS

Author Unknown, "Mooney FlowMax Low Flow Range Extender (LFRX)," Product Data Sheet, GE Oil & Gas, 2012, General Electric Company, 2 pages.
Search Report for United Kingdom Patent Application No. GB1607222.5, dated Nov. 21, 2016, 3 pages.
International Search Report and Written Opinion for PCT/GB2017/051149, dated Jul. 27, 2017, 13 pages.
International Preliminary Report on Patentability for PCT/GB2017/051149, dated Nov. 8, 2018, 8 pages.

* cited by examiner

FLUID FLOW CONTROL DEVICE

This application is a 35 U.S.C. § 371 national phase filing of International Application No. PCT/GB2017/051149 filed on Apr. 25, 2017, and claims the benefit of United Kingdom Patent Application No 1607222.5 filed on Apr. 26, 2016, wherein the disclosures of the foregoing applications are hereby incorporated by reference herein in their respective entireties.

This invention relates to a device for controlling the flow of fluid therethrough, in particular to a device including a removable insert that is arranged to adjust the flow capacity of such a device.

In fluid flow systems such as pipes and conduits, e.g. as can be found in many different industrial situations, there is a need to regulate the pressure in a fluid flow stream. In such systems there is an input pressure that may be constant or fluctuating in time and which it is desired to control to a lower target output pressure, which also can be constant or fluctuating.

One example of such devices is a pressure regulator as disclosed in the Applicant's previous application WO 2013/068747 A1 which is arranged to control the downstream pressure in a conduit. The flow through the pressure regulator is selectively controlled by a valve member that opens and closes a plurality of valve apertures dependent upon the difference between the pressure in the downstream side of the conduit and a reference pressure that is arranged to act on the valve member.

In this design, for any given pressure regulator the only variable is the reference pressure and thus the pressure regulator is not able to be adapted easily for different pressure regimes or operating characteristics.

It is an object of the invention to provide a device whose flow operating characteristics, e.g. flow capacity, may be adjusted.

When viewed from a first aspect the invention provides a device for controlling the flow of a fluid through a conduit from an upstream side of the device to a downstream side of the device, the device comprising:
  a housing comprising a wall having defined therein a plurality of valve apertures through which the flow of fluid is selectively controlled;
  a valve member mounted on a first side of the wall of the housing and arranged to move reciprocally to selectively open and close the plurality of valve apertures, thereby controlling flow of the fluid through the plurality of valve apertures; and
  a removable insert mounted on a second side of the wall of the housing, wherein the second side of the wall is on the opposite side of the wall from the first side of the wall, and the removable insert is arranged to cover at least some but not all of the plurality of valve apertures so to prevent the flow of fluid through the at least some of the plurality of valve apertures.

The present invention provides a device for controlling (e.g. pressure regulating) the flow of fluid through a conduit (e.g. in which the device is placed). The flow of fluid through the device is controlled between an upstream side of the device and a downstream side of the device, with multiple valve apertures of the device, for example, defining the boundary between the upstream and downstream sides. The multiple valve apertures are defined in a wall of the housing of the device and the flow of fluid through the multiple valve apertures, and thus through the device from the upstream side to the downstream side, is controlled by a valve member that is movably mounted on the wall of the housing. The valve member is arranged to move reciprocally on the wall of the housing to selectively open and close the multiple valve apertures that are defined in the wall.

The valve member is mounted on one side of the wall of the housing and a removable insert is removably mounted on the opposite side of the wall of the housing. The removable insert is mounted so to block off at least some, but not all, of the multiple valve apertures, so that the flow of fluid through the multiple valve apertures, and thus the device, is restricted, i.e. reduced compared to if the removable insert were to be removed and all of the multiple valve apertures were able to be opened by the valve member.

Thus it will be appreciated that the device of the present invention, by including a removable insert that blocks a portion of the multiple valve apertures, allows the flow capacity of the device to be adjusted in a simple and cost effective manner. This is because a single design for the housing and the multiple valve apertures defined in the housing wall, and thus for the device, can be provided. A removable insert which, for example, may be selected from one of multiple different designs, can then be mounted on the wall of the housing to cover the desired proportion of the multiple valve apertures in order to adjust the flow capacity as desired. This insert is likely to be significantly cheaper than the alternative of manufacturing multiple different designs of flow control devices to suit different operating requirements.

Furthermore, it will be appreciated that once a flow control device is installed, one design of the removable insert may be replaced with a different design of the removable insert so that the proportion of the valve apertures blocked by the removable insert may be changed, e.g. to increase or decrease the flow capacity of the device.

It will also be appreciated that the housing (in which the multiple valve apertures are formed) may be able to provide a structural, e.g. pressure loaded, component of the device, such that it may not be (and in preferred embodiments is not) necessary for the removable insert to have any pressure loading or structural capacity. The removable insert is preferably simply designed to block some of the multiple valve apertures, with the pressure loading being taken by the strength of the housing.

The device may be any suitable and desired type of device for controlling the flow of fluid therethrough, e.g. a pressure regulator or a control valve. In a preferred embodiment the housing comprises a cylinder, e.g. the wall of the housing comprises a cylinder, preferably with the plurality of valve apertures each arranged to extend radially through the cylindrical wall of the housing. Therefore preferably the valve member comprises a cylinder. Preferably also the removable insert comprises a cylinder. Thus the valve member may be mounted on the outside or inside of the cylindrical housing and the removable insert may be mounted on the inside or the outside of the cylindrical housing respectively. Preferably the removable insert is arranged on the pressure-loaded side of the cylindrical housing (typically the upstream side of the housing). This enables the housing to bear the load of the pressure and not the removable insert (which, as discussed above, may not have any particular pressure loading or structural capacity).

Thus in one particularly preferred embodiment the wall of the housing comprises a cylinder (in which the plurality of valve apertures are defined) and a cylindrical valve member is mounted coaxially on the outside of the wall of the housing and arranged to move reciprocally in a direction in which the cylindrical housing and valve member are cylindrically extended (i.e. parallel to the main axis of the cylinders), and the removable insert comprises a cylinder (e.g. in which there are apertures so to leave open some of the valve apertures) that is mounted coaxially on the inside of the wall of the housing.

In an alternative preferred embodiment the wall of the housing comprises a cylinder and a cylindrical valve member is mounted coaxially on the inside of the wall of the housing and arranged to move reciprocally in a direction in which the cylindrical housing and valve member are cylindrically extended, and the removable insert comprises a cylinder that is mounted coaxially on the outside of the wall of the housing.

The removable insert may be mounted on the wall of the housing in any suitable and desired (removable) way. In a preferred embodiment the removable insert is elastically deformable, e.g. sprung, so that it is resiliently mounted on the housing. This helps to allow the removable insert to be mounted on the cylinder relatively easily but to remain in place, e.g. without any significant movement in position, under normal operating conditions of the device. It also helps to allow the removable insert to be removed and re-mounted (e.g. to change the design of the removable insert) without too much effort.

The removable insert may be held (e.g. snugly) in place, mounted on the housing, in any suitable and desired way, e.g. by means of a clip. However preferably the removable insert is held in place solely by the elastic deformability thereof. This helps to reduce the wear, e.g. on the removable insert and the housing, over its operating lifetime. Thus, for example, in the embodiment in which the removable insert is mounted on the outside of the housing, the removable insert may be stretched to mount it on the outside of the housing. Alternatively, for example, in the embodiment in which the removable insert is mounted on the inside of the housing, the removable insert may be compressed to mount it on the inside of the housing.

The elastic deformability of the removable insert may be provided in any suitable and desired way. In one embodiment the structure of the removable insert is elastically deformable. In another embodiment the material of the removable insert is elastically deformable. (It may be that the removable has both a structure and a material that are elastically deformable.)

When the structure of the removable insert is arranged so that the removable insert is elastically deformable, preferably the removable insert comprises a slit, e.g. so that the removable insert is sprung. The slit may thus allow the removable insert to be compressed or pulled apart for mounting it on the housing (preferably then the removable insert exerts a biasing force to move it back towards its original configuration so that the removable insert holds, e.g. itself, in place when mounted on the housing). Preferably the slit extends along, e.g. the length of the cylinder of, the removable insert, e.g. in a direction having at least a component parallel to the main axis of the cylinder. This helps to allow the removable insert to be extended or compressed in the radial direction.

In the embodiment in which the structure of the removable insert is arranged so that the removable insert is elastically deformable, the removable insert may comprise any suitable and desired material. In a preferred embodiment the removable insert comprises a metal, e.g. stainless steel. The removable insert may also comprise a plastic, e.g. acrylonitrile butadiene styrene (ABS).

When the material of the removable insert is arranged so that the removable insert is elastically deformable, the material may be any suitable and desired elastically deformable material. In a preferred embodiment the removable insert comprises an elastically deformable plastic, e.g. ABS. The removable insert may also comprise hard rubber.

The removable insert may have any suitable and desired dimensions, e.g. depending on the dimensions of the housing on which it is mounted. For example, when the removable insert is mounted on the outside of the housing, preferably the natural internal dimension of the removable insert (e.g. before mounting on the housing) is less than the external dimension (e.g. diameter) of the housing. Alternatively, for example, when the removable insert is mounted on the inside of the housing, preferably the natural external dimension of the removable insert (e.g. before mounting on the housing) is less than the internal dimension (e.g. diameter) of the housing.

In a preferred embodiment the (e.g. radial) thickness of the removable insert is approximately 2 mm when the removable insert comprises plastic and is approximately 1 mm when the removable insert comprises metal.

In a preferred embodiment the removable insert comprises one or more, e.g. two, mounting lugs for securing the removable insert to the housing (e.g. on the outside or inside of the removable insert depending on which side of the housing the removable insert is mounted). Preferably each of the one or more mounting lugs are arranged to engage with a corresponding feature, e.g. a recess, on the wall of the housing when the removable insert is mounted on the housing. The corresponding feature(s) could be a feature(s) specifically provided to receive the one or more mounting lugs. However preferably the one or more mounting lugs are each arranged to engage with a corresponding valve aperture. Arranging the one or more mounting lugs to mate with corresponding valve apertures in the wall of the housing provides a convenient mechanism for securing the removable insert on the housing.

The plurality of valve apertures in the housing may be arranged in any suitable and desired pattern. Preferably the plurality of valve apertures are rotationally, e.g. circumferentially, balanced, so that the open area of the valve apertures (and thus the flow capacity) may be balanced in each direction through the valve apertures.

In one embodiment the plurality of valve apertures are arranged in a plurality of helixes. Preferably the design of the removable insert is arranged to match the pattern of the valve apertures, e.g. so that it covers a set proportion of the plurality of valve apertures. Thus preferably the (valve apertures that are covered by the) removable insert is rotationally balanced, e.g. when integrated along the (e.g. axial) length of the removable insert. In one embodiment the removable insert is rotationally symmetric, e.g. about the axial direction. The removable insert preferably has 2, 3 or 4 fold rotational symmetry.

Preferably the removable insert is arranged to cover some of the plurality of valve apertures fully and to leave the remainder of the plurality of valve apertures fully open (i.e. preferably none of the plurality of valve apertures are partially covered).

In a particularly preferred embodiment the one or more mounting lugs are arranged so that when mounted on the housing the removable insert covers some of the plurality of valve apertures fully and leaves the remainder of the plurality of valve apertures fully open, i.e. the position of the mounting lugs acts to align the removable insert with respect to the plurality of valve apertures.

Thus preferably the removable insert is arranged to cover a set proportion of the plurality of valve apertures, e.g. 30%, 50%, or 70%. As discussed above, a plurality of removable inserts may be provided with the fluid flow control device, e.g. to cover different proportions of the plurality of valve apertures so that the device may be configured to have different fluid flow capacities.

In a preferred embodiment the design of the removable insert is arranged to preserve the operating characteristics (e.g. the linear response characteristics) of the fluid flow control device, when the removable insert is mounted on the housing (compared to the operating characteristics of the fluid flow control device when the removable insert is removed from the device). Preferably the removable insert is arranged to cover an equal proportion of the valve apertures along the, e.g. cylindrical, length of the housing.

To achieve this, e.g. when the removable insert comprises a cylinder, preferably the removable insert comprises one or more apertures, e.g. two aperture, that extend along the corresponding, e.g. cylindrical, length of the plurality of valve apertures (e.g. in a direction parallel to the, e.g. cylindrical, axis of the housing), wherein the one or more apertures in the removable insert are arranged to leave open an equal proportion of the valve apertures along the, e.g. cylindrical, length of the housing. In other words preferably the, e.g. cylindrical, body of the removable insert comprises one or more wall sections that extend along the corresponding, e.g. cylindrical, length of the plurality of valve apertures (e.g. in a direction parallel to the, e.g. cylindrical, axis of the housing), wherein the one or more wall sections of the removable insert are arranged to cover an equal proportion of the valve apertures along the, e.g. cylindrical, length of the housing.

When the housing and the removable insert are cylindrical, preferably the one or more apertures (or the one or more wall sections) of the removable insert extend helically around the, e.g. circumference of the cylindrical body of the, removable insert. This helps to maintain flow through the plurality of valve apertures around as much of the circumference of the housing as possible, and is particularly applicable when the valve apertures also extend in a helical pattern, e.g. the aperture(s) of the removable insert are arranged to match the pattern of the valve apertures.

The design of the removable insert may be arranged to tune the fluid flow control device to a particular operating characteristic, e.g. in conjunction with reducing the fluid flow capacity of the device. This enables the flow capacity to be set as a function of the displacement of the valve member.

For example, it may be desired to maximise the displacement of the valve member at low flow rates in order to give the fluid flow control device a non-linear response at low flow rates, e.g. when the valve member is covering a large proportion (e.g. at least a majority) of the plurality of valve apertures. Thus preferably the removable insert is arranged to cover the some of the plurality of valve apertures such that for a given percentage change in the displacement of the valve member there is a resulting similar percentage change in the flow capacity (i.e. area of the valve apertures open).

In another example, it may be desired to retain the linear operating characteristics of the fluid flow control device across all displacements of the valve member. Thus preferably the removable insert, when mounted on the housing, changes the fluid flow control device to have a linear relationship between the displacement of the valve member and the resulting flow capacity.

The relationship between the displacement of the valve member and the flow capacity through the some of the plurality of valve apertures that remain open may be any suitable and desired relationship. The relationship may be linear, polynomial or exponential, or a combination of two or more such functions. The relationship may also change along the length of travel of the valve member, e.g. it may have one relationship at low flow rates and another at high flow rates.

The removable insert may be manufactured in any suitable and desired manner, e.g. depending on the material of the removable insert. When the removable insert is plastic, the removable insert may be formed by 3D printing, injection moulding or machining (e.g. using laser cutting or computer numerical control (CNC)). When the removable insert is metal, preferably the shape of the removable insert is machined (e.g. using laser cutting or CNC) from a metal sheet and then formed into the configuration for mounting on the housing, e.g. rolled into a cylinder.

The removable insert may be mounted, e.g. installed, on the housing in any suitable and desired way. In a preferred embodiment the removable insert and the fluid flow control device, e.g. the housing thereof, are arranged such that the user of the fluid flow control device is able to mount the removable insert on the housing. Preferably the removable insert is able to be fitted (and, e.g., replaced) without any disassembly of the fluid flow control device.

The Applicant considers the removable insert per se to be novel and inventive and thus when viewed from a further aspect the invention provides a removable insert for mounting in a fluid flow control device and for controlling the flow of a fluid through a plurality of apertures defined in a cylindrical housing of the device, the removable insert comprising an elastically deformable cylindrical body, the cylindrical body comprising one or more helically extended wall sections and one or more helically extended apertures extending around at least part of the circumference of the cylindrical body, wherein the one or more helically extended wall sections are arranged, when the removable insert is mounted on the cylindrical housing of the device, to cover at least some but not all of the plurality of valve apertures so to prevent the flow of fluid through the at least some of the plurality of valve apertures and the one or more helically extended apertures are arranged, when the removable insert is mounted on the cylindrical housing of the device, to align with the remainder of the plurality of valve apertures so allow the flow of fluid through the remainder of the plurality of valve apertures.

As will be appreciated by those skilled in the art, this aspects of the present invention can, and preferably does, include any one or more or all of the preferred and optional features of the present invention discussed herein, as appropriate.

Certain preferred embodiments of the invention will now be described, by way of example only, with reference to the accompanying drawings in which.

There are many different industrial situations in which there is a desire to regulate the pressure in a fluid flow stream through a pipe or conduit. In such systems there is an input pressure that may be constant or fluctuating in time and which it is desired to control to a lower target output pressure, which also can be constant or fluctuating. As will now be described, embodiments of the present invention provide devices that are able to provide this control for the fluid flow.

Figure 1:
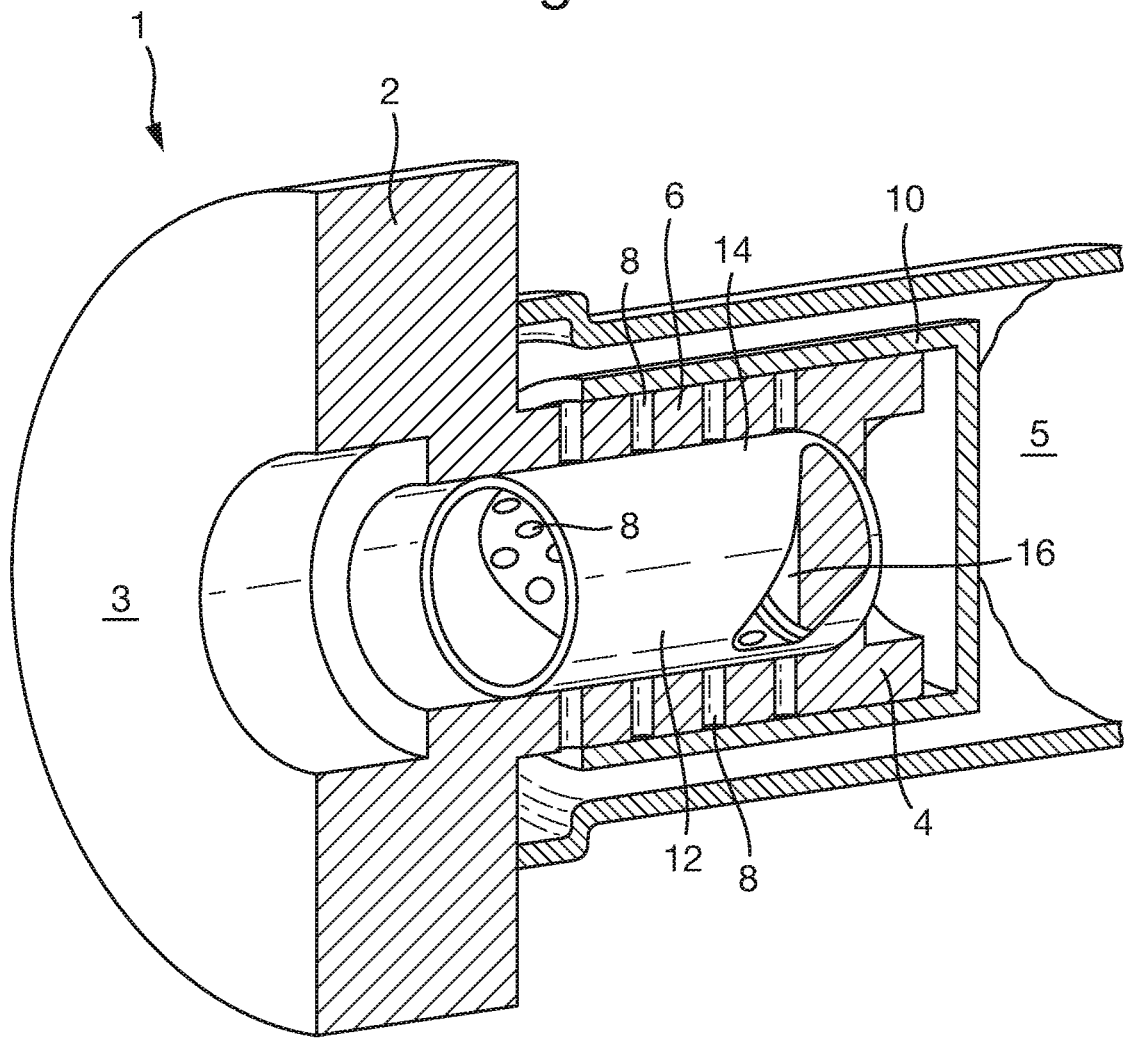
FIG. 1 shows a cutaway view of a fluid flow control device in accordance with an embodiment of the present invention.

FIG. 1 shows a cutaway view of a fluid flow control device 1 in accordance with an embodiment of the present invention. The device 1, e.g. a pressure regulator, includes a flange 2 for mounting the device 1 in a section of pipe, e.g. clamped between a joint in the pipework. The device also includes a housing 4 that has a cylindrical wall 6 in which a plurality of valve apertures 8, extending axially through the cylindrical wall 6, are formed. The plurality of valve apertures 8 are each circular in cross section and are arranged in helically extending rows around the circumference of the cylindrical wall 6 of the housing 4.

The plurality of valve apertures 8 allow fluid to pass from an upstream side 3 of the pipe to a downstream side 5 of the pipe. The flow of the fluid through the plurality of valve apertures 8 is controlled by a cylindrical valve member 10 that is mounted coaxially on the outside of the cylindrical wall 6 of the housing 4, and arranged to move reciprocally in a direction parallel to the main cylindrical axis of the housing 4 and the valve member 10.

Figure 2:
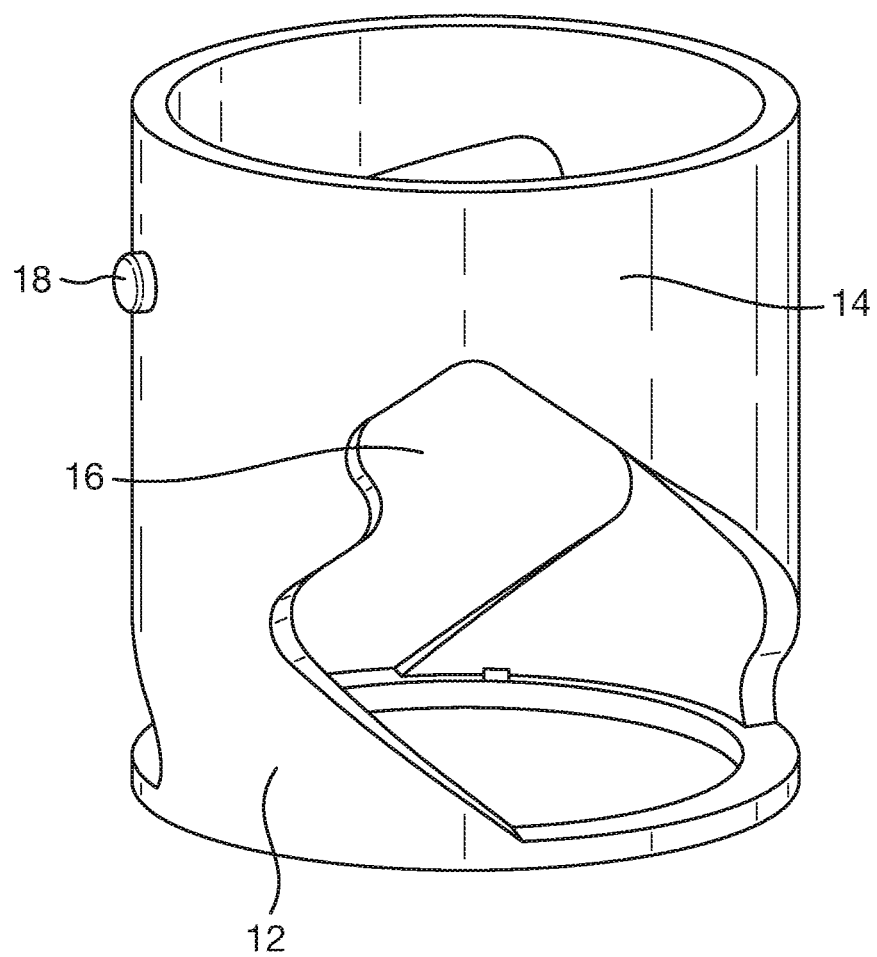
FIG. 2 shows a perspective view of a removable insert in accordance with an embodiment of the present invention for use with a fluid flow control device.

A removable cylindrical plastic insert 12 is mounted coaxially against the inside of the cylindrical wall 6 of the housing 4. FIG. 2 shows a perspective view of the removable cylindrical plastic insert 12.

The removable cylindrical plastic insert 12 has a cylindrical body 14 in which two helically extending apertures 16 are formed. The helically extending apertures 16 are designed to match the pattern of the plurality of valve apertures 8 formed in the cylindrical wall 6 of the housing 4, such that a discrete number of the plurality of valve apertures 8 are covered by the cylindrical body 14 of the removable cylindrical plastic insert 12 and a discrete number of the plurality of valve apertures 8 are left open by the helically extending apertures 16, i.e. each of the plurality of valve apertures 8 are either fully covered or fully open.

The removable cylindrical plastic insert 12 also has two lugs 18 arranged diametrically opposite each other on the outside of the cylindrical body 14. The lugs 18 are each arranged to mate with one of the plurality of valve apertures 8 in the cylindrical wall 6 of the housing 4, both in order to help hold the removable cylindrical plastic insert 12 in place during operation of the fluid flow control device 1 and to align the helically extending apertures 16 in the cylindrical body 14 of the removable cylindrical plastic insert 12 with the plurality of valve apertures 8 in the cylindrical wall 6 of the housing 4, i.e. such that each of the plurality of valve apertures 8 are either fully covered or fully open.

The removable cylindrical plastic insert 12 is 3D printed using ABS such that it is elastically deformable. This allows removable cylindrical plastic insert 12 to be press fit into the housing 4 such that it forms a tight fit against the cylindrical wall 6 of the housing. This tight fit helps the cylindrical body 14 of the removable cylindrical plastic insert 12 to cover the plurality of valve apertures 8 in the cylindrical wall 6 of the housing 4 in a leak-proof manner.

Operation of the fluid flow control device 1 will now be described with reference to FIGS. 1 and 2.

Either when the fluid flow control device 1 is in situ in the pipe or before the fluid flow control device 1 is inserted into the pipe, the removable cylindrical plastic insert 12 is press fit into the housing 4 of the fluid flow control device 1, and the two lugs 18 on the outside of the cylindrical body 14 of the removable cylindrical plastic insert 12 are located into two respective valve apertures of the plurality of valve apertures 8, so that the removable cylindrical plastic insert 12 is held in place and the two helically extending apertures 16 in the cylindrical body 14 of the removable cylindrical plastic insert 12 are aligned with the plurality of valve apertures 8 in the cylindrical wall 6 of the housing 4 that are not to be covered.

It will be seen that with the removable cylindrical plastic insert 12 installed in the fluid flow control device 1, a proportion of the plurality of valve apertures 8 in the cylindrical wall 6 of the housing 4 are covered by the cylindrical body 14 of the removable cylindrical plastic insert 12 and a proportion of the plurality of valve apertures 8 remain open through being aligned with the two helically extending apertures 16 in the cylindrical body 14 of the removable cylindrical plastic insert 12. This results in the number of the plurality of valve apertures 8 that are open being reduced compared to when the removable cylindrical plastic insert 12 is not installed in the fluid flow control device 1.

The reduction in the number of the plurality of valve apertures 8 that are open thus reduces the fluid flow capacity of the fluid flow control device 1. As the two helically extending apertures 16 in the cylindrical body 14 of the removable cylindrical plastic insert 12 extend along the full length of the plurality of valve apertures 8, the reduction in flow capacity of the fluid flow control device 1 is effective for the full length of travel of the valve aperture 10.

Figure 3:
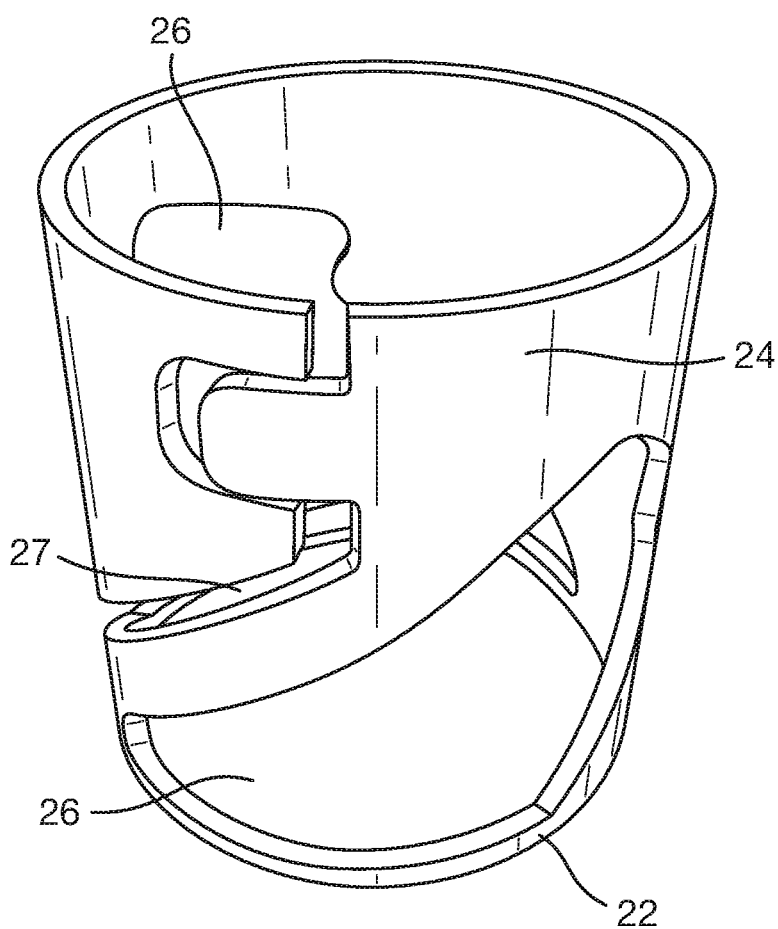
FIG. 3 shows a perspective view of a removable insert in accordance with another embodiment of the present invention for use with a fluid flow control device.

FIG. 3 shows a perspective view of a removable insert 22 in accordance with another embodiment of the present invention for use with a fluid flow control device, e.g. the one shown in FIG. 1. The removable insert 22 shown in FIG. 3 is very similar to that shown in FIGS. 1 and 2, except that it is made from metal.

The removable insert 22 of FIG. 3 is laser cut from a sheet of stainless steel and then rolled into a cylinder, such that it has a cylindrical body 24 and two helically extending apertures 26. The removable metal insert 22 has a slit 27 that extends along its length such that it is sprung, i.e. elastically deformable at least in a radial direction.

Figure 4:
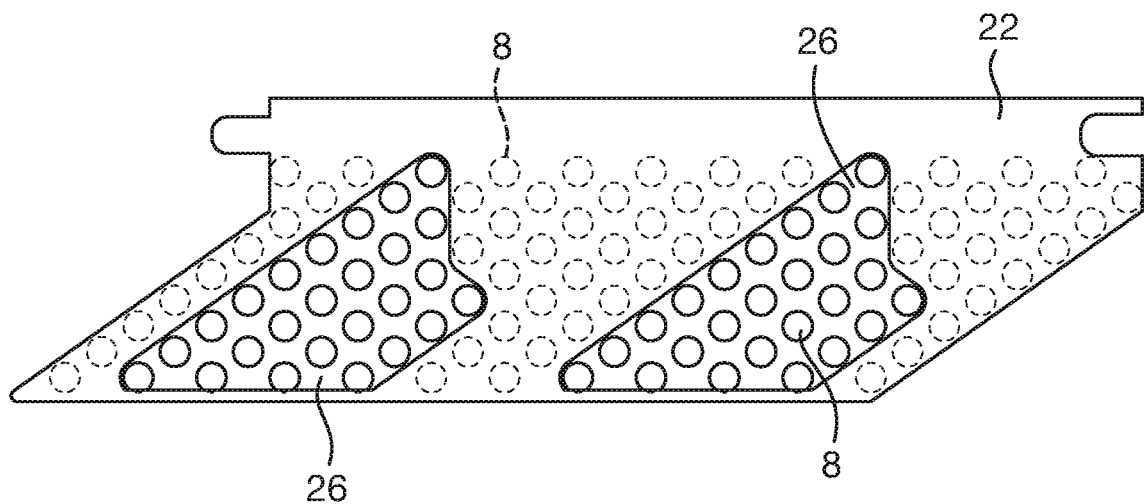
FIG. 4 shows an unwrapped view of the removable insert shown in FIG. 3.

FIG. 4 shows an unwrapped view of the removable insert 22 shown in FIG. 3 (i.e. its shape after it has been laser cut but before it has been rolled into a cylinder), superimposed on a typical pattern of the valve apertures 8 in the wall of the cylindrical housing of the fluid flow control device, e.g. as shown in FIG. 1.

It can be seen form FIG. 4 that the apertures 26 in the removable insert 22 align with the valve apertures 8 in the wall of the cylindrical housing such that when the removable insert 22 is installed in the fluid flow control device the valve apertures 8 are either fully open or fully closed.

The operation of the removable insert 22 of FIGS. 3 and 4 is very similar to that shown in FIGS. 1 and 2, i.e. its elastic deformability is used to insert it into a fluid flow control device, e.g. as shown in FIG. 1, such that it is held tightly in place against the wall of the cylindrical housing of the fluid flow control device and covers a proportion of the plurality of valve apertures in the wall of the cylindrical housing, leaving a proportion of the plurality of valve apertures open. Again, this acts to reduce the open area of the valve apertures (and thus the flow capacity) of the fluid flow control device (compared to when the removable insert 22 is not installed).

Figure 5:
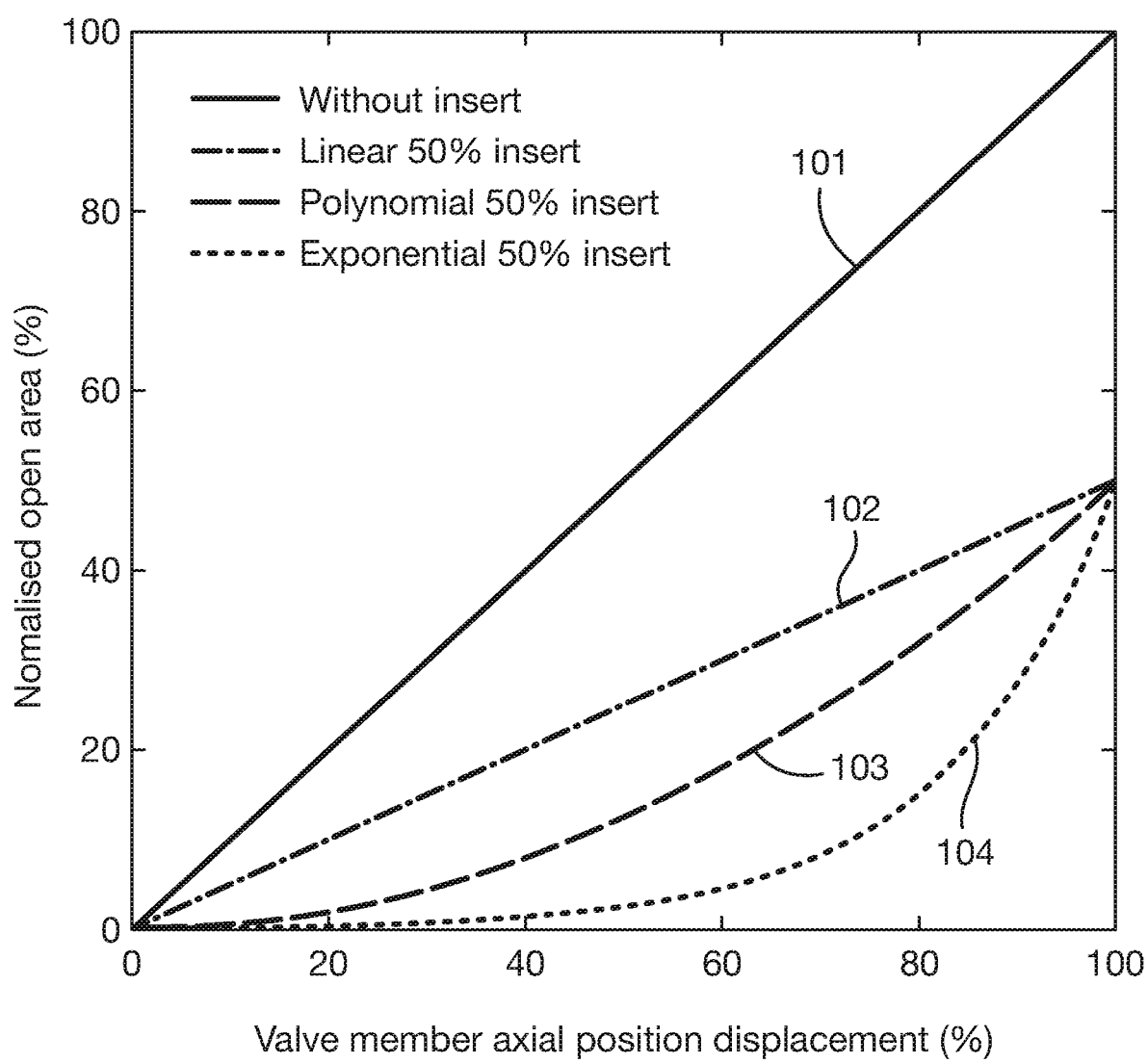
FIG. 5 shows a plot of the fluid flow characteristics of a fluid flow control device including a variety of removable inserts in accordance with the present invention.

FIG. 5 shows a plot of the fluid flow characteristics of a fluid flow control device, e.g. as shown in FIG. 1, including a variety of removable inserts in accordance with the present invention, e.g. as shown in FIGS. 1-4. The plot shows the normalised open area of the valve apertures in the fluid flow control device as a function of the axial displacement of the valve member.

A line of constant gradient 101 shows the operating characteristics of a fluid flow control device without a removable insert fitted. This shows that the normalised open area has a linear relationship with the axial displacement of the valve member.

A line of constant gradient 102, though reduced by 50% shows the operating characteristics of the fluid flow control device when a first removable insert is fitted. There is still a linear relationship with the axial displacement of the valve member, but at each value of the valve member displacement the normalised open area is reduced by 50% compared to when the removable insert is not installed in the fluid flow control device.

A polynomial line 103 shows the operating characteristics of the fluid flow control device when a second removable insert is fitted (i.e. instead of the first removable insert). The normalised open area has a polynomial relationship with the displacement of the valve member and with the maximum flow capacity, i.e. when the valve member is fully open, being 50% of the maximum normalised open area when the removable insert is not installed in the fluid flow control device.

The removable inserts shown in FIGS. 1 to 4 have the 50% polynomial relationship shown by the polynomial line 103 in FIG. 5.

An exponential line 104 shows the operating characteristics of the fluid flow control device when third removable insert is fitted (i.e. instead of the first and second removable inserts). The normalised open area of the valve apertures has an exponential relationship with the displacement of the valve member and with the maximum normalised open area, i.e. when the valve member is fully open, being 50% of the maximum normalised open area when the removable insert is not installed in the fluid flow control device. This exponential relationship means that for a given displacement of the valve member this results in the same percentage difference in the normalised open area of the valve apertures.

It can be seen from the above that in at least preferred embodiments, the fluid control flow device and the removable insert of the present invention provide a device for controlling the flow in a conduit in which the open area of the valve apertures (and thus the flow capacity) can be adjusted in a simple and cost effective manner. Multiple designs of the removable insert may be provided to suit different operating requirements so that only a single design for the design and the housing thereof (in which the multiple valve apertures are formed) may need to be manufactured. Once a flow control device is installed, the removable insert may be replaced with a different design of the removable insert so that the proportion of the valve apertures blocked by the removable insert may be changed, e.g. to increase or decrease the open area of the valve apertures (and thus the flow capacity) of the device. The housing is able to provide a structural, e.g. pressure loaded, component of the device, such that it is not necessary for the removable insert to have any pressure loading or structural capacity; the removable insert is preferably simply designed to block some of the multiple valve apertures, with the pressure loading being taken by the strength of the housing.

While a couple of particular embodiments have been described above with reference to the Figures, those skilled in the art will appreciate that any number of variations and alternatives may exist within the scope of the present invention. For example, the apertures in the removable insert may be different sizes and/or shapes, e.g. if the open area of the valve apertures and/or its relationship with the displacement of the valve member is desired to be changed. It will be appreciated that with multiple different designs of the removable insert the flow capacity and its characteristics may be tuned as desired for different particular operations.

Furthermore, the removable insert may be mounted on the outside wall of the housing of the fluid flow device, with the valve member being mounted on the inside wall of the housing of the fluid flow device.

The invention claimed is:

1. A device for controlling the flow of a fluid through a conduit from an upstream side of the device to a downstream side of the device, the device comprising:
a housing comprising a wall having defined therein a plurality of valve apertures through which the flow of fluid is selectively controlled;
a valve member mounted on a first side of the wall of the housing and arranged to move reciprocally to selectively open and close the plurality of valve apertures, thereby controlling flow of the fluid through the plurality of valve apertures; and
a removable insert mounted on a second side of the wall of the housing, wherein the second side of the wall is on an opposite side of the wall from the first side of the wall, and the removable insert is arranged to cover some but not all of the plurality of valve apertures so as to prevent the flow of fluid through the some but not all of the plurality of valve apertures.

2. The device as claimed in claim 1, wherein the wall of the housing comprises a cylinder, and each valve aperture of the plurality of valve apertures is arranged to extend radially through the cylindrical wall of the housing.

3. The device as claimed in claim 2, wherein the valve member comprises a cylinder and the removable insert comprises a cylinder.

4. The device as claimed in claim 1, wherein the wall of the housing comprises a cylinder and a cylindrical valve member is mounted coaxially on the inside of the wall of the housing and arranged to move reciprocally in a direction in which the housing and valve member are cylindrically extended, and the removable insert comprises a cylinder that is mounted coaxially on the outside of the wall of the housing.

5. The device as claimed in claim 1, wherein the removable insert is elastically deformable such that the removable insert is resiliently mounted on the housing.

6. The device as claimed in claim 5, wherein a structure of the removable insert is elastically deformable and/or a material of the removable insert is elastically deformable.

7. The device as claimed in claim 1, wherein the removable insert comprises one or more mounting lugs for securing the removable insert to the housing.

8. The device as claimed in claim 7, wherein each mounting lug of the one or more mounting lugs is arranged to engage with a corresponding feature on the wall of the housing when the removable insert is mounted on the housing.

9. The device as claimed in claim 7, wherein each mounting lug of the one or more mounting lugs is arranged to engage with a corresponding valve aperture.

10. The device as claimed in claim 7, wherein the one or more mounting lugs are arranged so that when mounted on the housing the removable insert fully covers some of the plurality of valve apertures and leaves a remaining group of one or more apertures of the plurality of valve apertures fully open.

11. The device as claimed in claim 1, wherein at least some valve apertures of the plurality of valve apertures are arranged in a plurality of helixes in the wall of the housing.

12. The device as claimed in claim 1, wherein a design of the removable insert is arranged to match a pattern of the valve apertures.

13. The device as claimed in claim 1, wherein the removable insert is arranged to cover an equal proportion of the valve apertures along the length of the housing.

14. The device as claimed in claim 1, wherein the removable insert comprises one or more apertures that extend along a corresponding length of the plurality of valve apertures, wherein the one or more apertures in the removable insert are arranged to leave open an equal proportion of the valve apertures along the length of the housing.

15. The device as claimed in claim 1, wherein the removable insert is rotationally symmetric.

16. A removable insert for mounting in a fluid flow control device and for controlling the flow of a fluid through a plurality of apertures defined in a cylindrical housing of the device, the removable insert comprising an elastically deformable cylindrical body, the cylindrical body comprising one or more helically extended wall sections and one or more helically extended apertures extending around at least part of the circumference of the cylindrical body, wherein the one or more helically extended wall sections are arranged, when the removable insert is mounted on the cylindrical housing of the device, to cover some but not all of the plurality of valve apertures so to prevent the flow of fluid through the some but not all of the plurality of valve apertures, and the one or more helically extended apertures are arranged, when the removable insert is mounted on the cylindrical housing of the device, to align with a remaining group of one or more valve apertures of the plurality of valve apertures so allow the flow of fluid through the remaining group of one or more valve apertures.

* * * * *